United States Patent
Zhong et al.

(10) Patent No.: US 9,946,461 B2
(45) Date of Patent: Apr. 17, 2018

(54) IN-FLASH IMMUTABLE OBJECT PROCESSING

(71) Applicant: ScaleFlux, San Jose, CA (US)

(72) Inventors: Hao Zhong, Los Gatos, CA (US); Fei Sun, Irvine, CA (US); Yang Liu, Milpitas, CA (US)

(73) Assignee: SCALEFLUX, INC., San Jose, CA (US)

( * ) Notice: Subject to any disclaimer, the term of this patent is extended or adjusted under 35 U.S.C. 154(b) by 7 days.

(21) Appl. No.: 15/154,018

(22) Filed: May 13, 2016

(65) Prior Publication Data
US 2016/0334996 A1    Nov. 17, 2016

Related U.S. Application Data

(60) Provisional application No. 62/161,938, filed on May 15, 2015.

(51) Int. Cl.
*G06F 3/06* (2006.01)
*G06F 9/50* (2006.01)
*G06F 17/30* (2006.01)

(52) U.S. Cl.
CPC .......... *G06F 3/0607* (2013.01); *G06F 3/0611* (2013.01); *G06F 3/0659* (2013.01); *G06F 3/0688* (2013.01); *G06F 9/5038* (2013.01); *G06F 17/30185* (2013.01); *G06F 2212/7208* (2013.01)

(58) Field of Classification Search
CPC ............... G06F 3/0688; G06F 12/0246; G06F 2212/7208
See application file for complete search history.

(56) References Cited

U.S. PATENT DOCUMENTS

| | | | | |
|---|---|---|---|---|
| 8,924,661 | B1* | 12/2014 | Shachar | G06F 13/1668 365/189.2 |
| 2010/0017650 | A1* | 1/2010 | Chin | G06F 11/108 714/6.12 |
| 2010/0235569 | A1* | 9/2010 | Nishimoto | G06F 12/06 711/103 |
| 2012/0060072 | A1* | 3/2012 | Simitci | H03M 13/373 714/756 |
| 2013/0205114 | A1* | 8/2013 | Badam | G06F 3/0613 711/207 |
| 2014/0157083 | A1* | 6/2014 | Shalvi | G06F 11/14 714/763 |
| 2014/0280187 | A1* | 9/2014 | Molaro | G06F 17/30321 707/741 |
| 2016/0139980 | A1* | 5/2016 | Cowling | G06F 11/1048 714/763 |

* cited by examiner

*Primary Examiner* — Edward J Dudek, Jr.
*Assistant Examiner* — Andrew Russell
(74) *Attorney, Agent, or Firm* — Hoffman Warnick LLC

(57) ABSTRACT

A storage infrastructure, device and associated method for processing immutable data objects using in-flash processing. An in-flash processing system is provided that includes: an input/output manager that receives parameters from a host to perform back-end data processing tasks on immutable objects and that outputs commands to read and write immutable data objects to and from super-pages in a set of flash memory storage devices; a priority manager that ensures that front-end data processing tasks takes priority over back-end data processing tasks; and a back-end processing system that processes at least one immutable object in order to generate at least one new immutable object.

16 Claims, 5 Drawing Sheets

IN-FLASH IMMUTABLE OBJECT PROCESSING

CROSS REFERENCE TO RELATED APPLICATION

This application claims priority to U.S. Provisional Patent Application Ser. No. 62/161,938, filed May 15, 2015, which is hereby incorporated herein as though fully set forth.

TECHNICAL FIELD

The present invention relates to the field of data storage and processing, and particularly to providing in-flash storage and processing of immutable data objects in various computing systems.

BACKGROUND

The entire information technology infrastructure increasingly employs the concept of immutable objects to embrace the data and workload characteristics of the big data era. Simply speaking, an immutable object is an object whose state/content cannot be modified after it is created. A variety of mainstream data-intensive applications/services heavily rely on the use of immutable objects, e.g., cloud data storage, log-structured file (LSF) systems, and log-structured merge tree (LSM-tree) based key-value store. In almost all the cloud storage systems such as Google Cloud Storage and Microsoft Azure Cloud Services adopt the use of immutable objects as the basis to store user data and carry out back-end operations (e.g., erasure coding) on immutable objects. LSM-tree based key-value store has been widely used in production systems (e.g., HBase, Cassandra, BigTable, and LevelDB) to handle real-time and write-intensive data processing. One key feature of LSM-tree is to employ immutable objects in its data structure, and the data structure management is realized by immutable object based operations such as merge and sort.

Flash-based solid-state data storage devices/systems have been increasingly deployed throughout the entire information technology infrastructure. Due to the size mismatch between the block-based erase operation and page-based write operation, flash memory fundamentally does not support update-in-place. Hence, once data have been written to a flash memory block, this block can be essentially considered as an immutable object.

SUMMARY

Accordingly, an embodiment of the present disclosure is directed to a method and a device that provides immutable object data storage and processing services. The device contains one or multiple flash memory chips and an integrated circuit chip that manages the immutable object storage among all the flash memory chips and carries out processing/management on immutable objects.

In a first aspect, the invention provides an in-flash processing system, comprising: an input/output manager that receives parameters from a host to perform back-end data processing on immutable objects and that outputs commands to read and write immutable data objects to and from super-pages in a set of flash memory storage devices; a priority manager that ensures that front-end data processing tasks take priority over back-end data processing tasks; and a back-end processing system that processes at least one immutable object in order to generate at least one new immutable object.

In a second aspect, the invention provides a method of processing immutable objects being read from and written to a set of flash memory storage devices, comprising: receiving, at a flash storage controller, parameters from a host to perform a back-end data processing task on at least one immutable object; suspending the back-end data processing task if there are any front-end data processing tasks to be performed; and performing the back-end processing task on the at least one immutable object in order to generate at least one new immutable object.

In a third aspect, the invention provides a storage infrastructure, comprising: a host; and a storage device, having: an input/output manager that receives parameters from the host to perform back-end data processing on immutable objects and that outputs commands to read and write immutable data objects to and from super-pages in a set of flash memory storage devices; a priority manager that ensures that front-end data processing tasks take priority over back-end data processing tasks; and a back-end processing system that processes at least one immutable object in order to generate at least one new immutable object.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to embodiments of the invention, examples of which are illustrated in the accompanying drawings.

Figure 1:
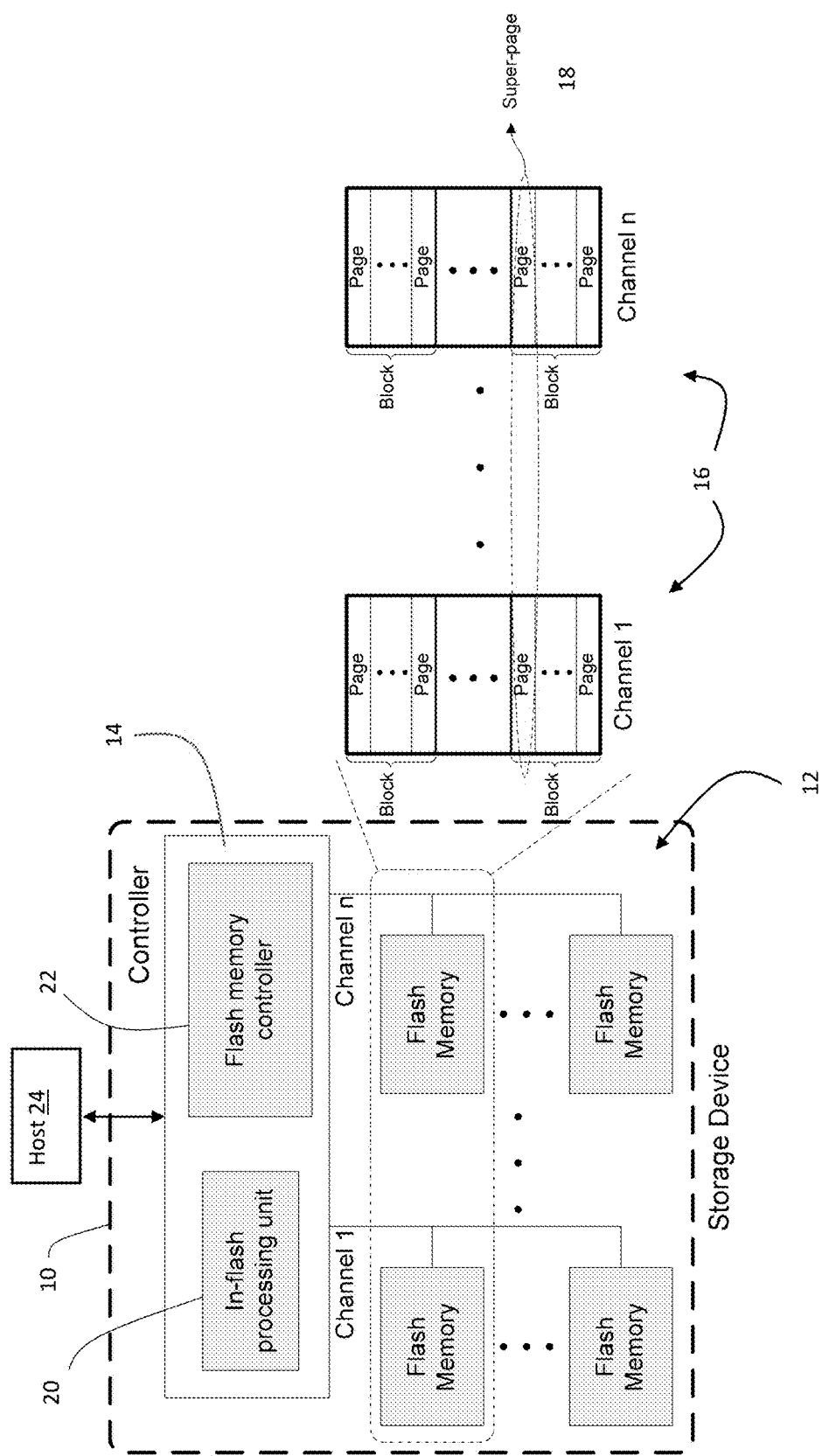
FIG. 1 illustrates the overall structure of the device according to embodiments.

As shown in FIG. 1, a flash based storage device 10 is disclosed that contains multiple flash memory chips 12 and a controller 14 that manages immutable object storage among all the flash memory chips 12 and carries out data processing on immutable objects. Controller 14 includes an in-flash processing unit 20 that provides the logic for processing data and managing storage decisions and a flash memory controller 22 that effectuates the physical reading and writing of data.

All the flash memory chips 12 are organized in a multi-channel structure. The controller 14 writes each immutable object across multiple channels 16 (e.g., n channels), in which each channel 16 includes a set of storage blocks, each having a set of pages. A page from each of the different n channels 16 are written during the same time forming a super-page 18.

Each immutable object is stored in one or multiple super-pages, and different immutable objects do not share any super-pages. As a result, the immutability of data and the object-oriented storage significantly simplifies the design of storage device firmware and reduce overhead of data address mapping.

Applications/systems involving immutable objects tend to carry out two types of operations: (1) Front-end operations that are directly invoked by user requests/actions, e.g., serving the Get and Put commands in key-value store, and user data read/write in LSF or cloud storage system; (2) Back-end operations that are transparent to the users and aim to manage internal data structure and/or serve internal system requests, e.g., erasure coding and object merging. In conventional design practice, both front-end and back-end operations are handled solely by processors (e.g., CPU, GPU, and even FPGA devices) in the host 24. As a result, front-end and back-end operations inevitably compete and interfere with each other on the utilization of the underlying hardware resources including computing resource, cache/memory resource, and processor-memory-storage data transfer resource. For applications/systems dealing with a large amount of data, the back-end operations can be very resource demanding and hence severely interfere with front-end operations, leading to noticeable degradation of user experience.

Leveraging the streaming and regular computation patterns inherent in most back-end operations on immutable objects, this approach offloads the core computational tasks of back-end operations into the flash-based data storage devices. Back-end operations on immutable objects typically share a common feature: they carry out regular computations on one or multiple immutable objects in order to generate one or multiple new immutable objects. One example is erasure coding. Once user data are uploaded and sealed as an immutable object by the storage server, the data within this immutable object will be processed by erasure encoding and generate a group of objects being protected by the erasure code, and the newly formed objects will be distributed to different storage nodes. Another example is the merge operation in LSM-tree based key-value store: The key-value store maintains its internal database in a hierarchical tree structure, in which each node at each level is an immutable object consisting of sorted key-value entries. As its size grows over the time, the key-value store needs to merge multiple nodes at one level and hence create one or multiple nodes at the next level down the tree. As a back-end operation aiming to maintain a balanced tree-based data structure, such merge operations is completely transparent to the users but can occupy a large portion of computing and memory resources.

To initiate the in-flash immutable object processing, the host 24 provides a set of parameters, including: (1) identifiers of one or multiple input immutable objects, based upon which the processing will be carried out, (2) identifiers of one or multiple output immutable objects that are generated by the back-end processing and which are stored in the flash-based storage devices, (3) processing function information regarding the particular processing function to be executed by the controller 14 and necessary configuration parameters. In order to minimize the impact on the user experience, the (back-end) in-flash immutable object processing has a lower priority than other more latency-critical (front-end) data access commands issued by host. Whenever there is no outstanding data access command issued by the host, the controller 14 carries out the back-end in-flash processing task. Once a data access command issued by the host arrives, the back-end in-flash processing task is immediately suspended, and the controller 14 services the incoming host-issued command as soon as possible. After servicing the host-issued read command, if there are no more outstanding host-issued data access commands, the controller will resume and continue the back-end in-flash processing task.

The back-end in-flash data processing tasks can fall into two categories from data input-output mapping characteristics: (1) stationary-mapping processing tasks: Given the same processing task configuration, any portion of an output object is only dependent on a fixed portion of input objects, regardless to the run-time data content. In particular, let $O=[O_1, O_2, \ldots, O_r]$ denote the data of the output object, where each $O_i$ represents a data segment. Assume there are d input objects, and let $I_i=[I_{i,1}, I_{i,2}, \ldots, I_{i,r(i)}]$ denote the data of the i-th input object, where each $I_{i,j}$ represents a data segment and there is a total r(i) segments. Each segment $O_j$ in the output object is computed by the processing task based upon a fixed set of segments in the d input objects, denoted as $\Gamma_j$. An example stationary-mapping task is the erasure coding; (2) non-stationary-mapping processing tasks: Given the same processing task configuration, any portion of an output object may depend upon a varying portion of input objects, which may be determined by the run-time data content. An example non-stationary-mapping task is the merge operation in LSM-tree based key-value store.

Figure 2:
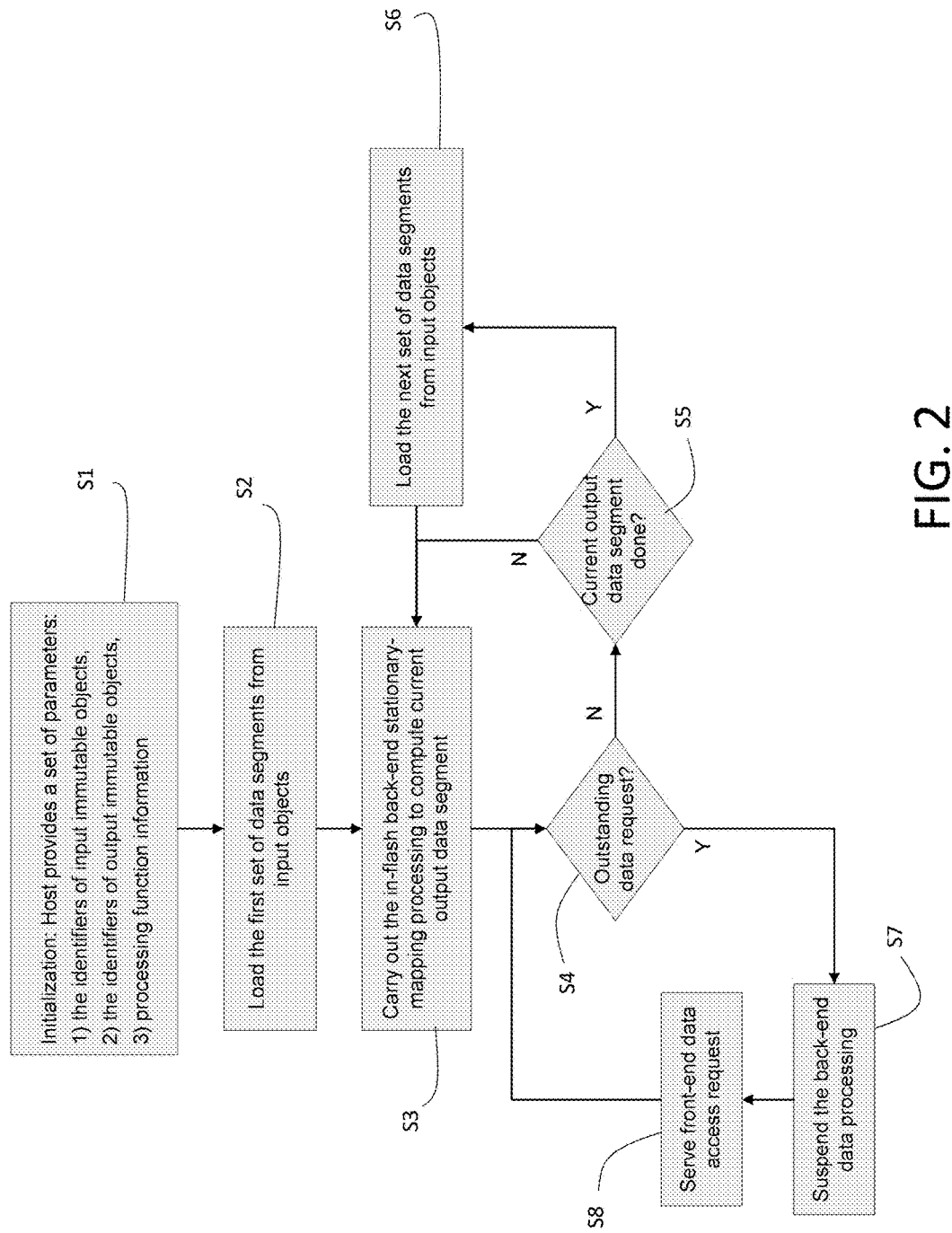
FIG. 2 illustrates the flow diagram of stationary-mapping processing tasks according to embodiments.

FIG. 2 shows the flow diagram of a stationary-mapping processing task. At S1, the host 24 provides a set of parameters. To generate each segment $O_j$ in the output object, the controller 14 loads the associated set of segments $\Gamma_j$ from the input objects into its cache memory at S2. Given the set of parameters from the host 24, the controller 14 carries out the stationary-mapping data processing at S3 in a pre-determined manner in terms of reading data from input objects and writing output object data. At S4, a determination is made if there are any outstanding front-end data requests. If no, a check is made at S5 whether the current output data segment is done. If yes, then the next set of data segments are loaded at S6, and the process loops back to S3. If no, then the process loops back to S3. If there are no front end outstanding data requests at S4, then the back-end data processing is suspending at S7 and the front-end data access requests are processed at S8 since the processing has a lower priority than the data access commands invoked by front-end services.

Figure 3:
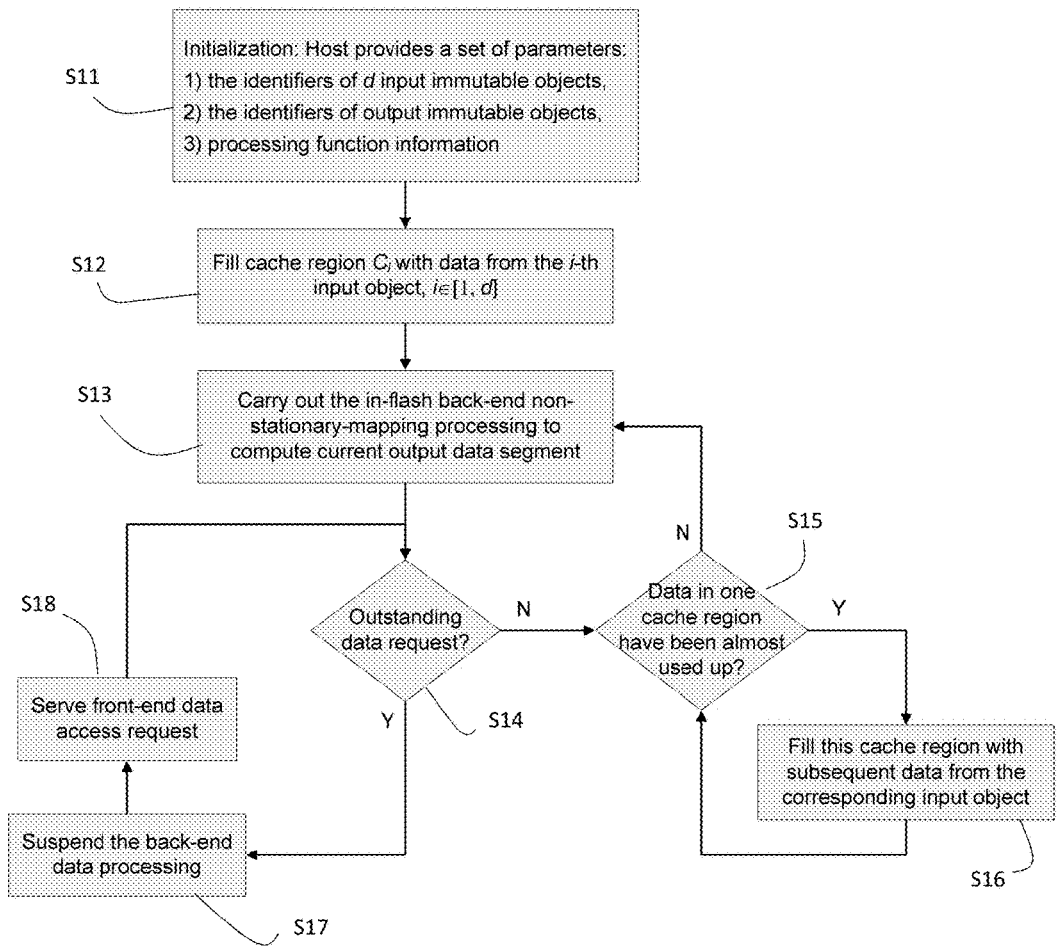
FIG. 3 illustrates the flow diagram of non-stationary-mapping processing tasks according to embodiments.

FIG. 3 shows the flow diagram of a non-stationary-mapping processing task. At S1, the host 24 provides a set of parameters. In this example, assume there are d input immutable objects. The controller 14 partitions its cache memory into d regions, and each region Ci stores the data from the i-th object at S12. During the runtime, the controller 14 carries out the non-stationary-mapping processing at S13 based upon the data being stored in the d regions. At S14, a check is made whether there are any outstanding front-end data requests. If so, then the back-end data processing is suspended at S17 and the front-end request is processed at S18.

If no front-end requests exist at S14, then a check is made whether data in one of the cache regions has been used up at S15. Due to the non-stationary-mapping nature, data in different regions are consumed by the controller with a different rate. Whenever the data in one region (e.g., Cj) have been (almost) completely consumed by the controller 14, subsequent data from the j-th object will be loaded into the cache region at S16. Once completed, the process loops back to S13.

This approach may further include a randomized intra-super-page data shuffling strategy to maximize the throughput of back-end immutable object processing. Recall that each super-page contains n flash memory pages. There are N=n! different n-tuple permutations. Let each object identifier is m-bit. The process constructs a hash function f(s) that hash an m-bit data s into a hash value h∈[1, N]. For each immutable object, the controller hashes its m-bit object identifier and obtains its hash value p, and accordingly shuffles the n pages within each super-page using the h-th n-tuple permutation pattern before storing into the n flash memory physical pages. In particular, for one immutable object spanning over s super-pages and hence containing up to s E n pages of data, the system logically denotes each page of data in the object as $l_{i,j}$, where index i∈[1, s] and j∈[1, n]. Meanwhile, the s super-pages contains s E n physical flash memory pages, each physical page is denoted as $p_{i,j}$, where index i∈[1, s] and j∈[1, n]. Without any shuffling, conventional practice simply writes the logical page $l_{s,t}$ to the physical page $p_{s,t}$. Using this randomized intra-super-page data shuffling strategy, let $\Phi_h(i)$ denote the h-th n-tuple permutation, the logical page $l_{s,t}$ is written to the physical page $p_{s,k}$, where $k=\Phi_h(t)$.

Figure 4:
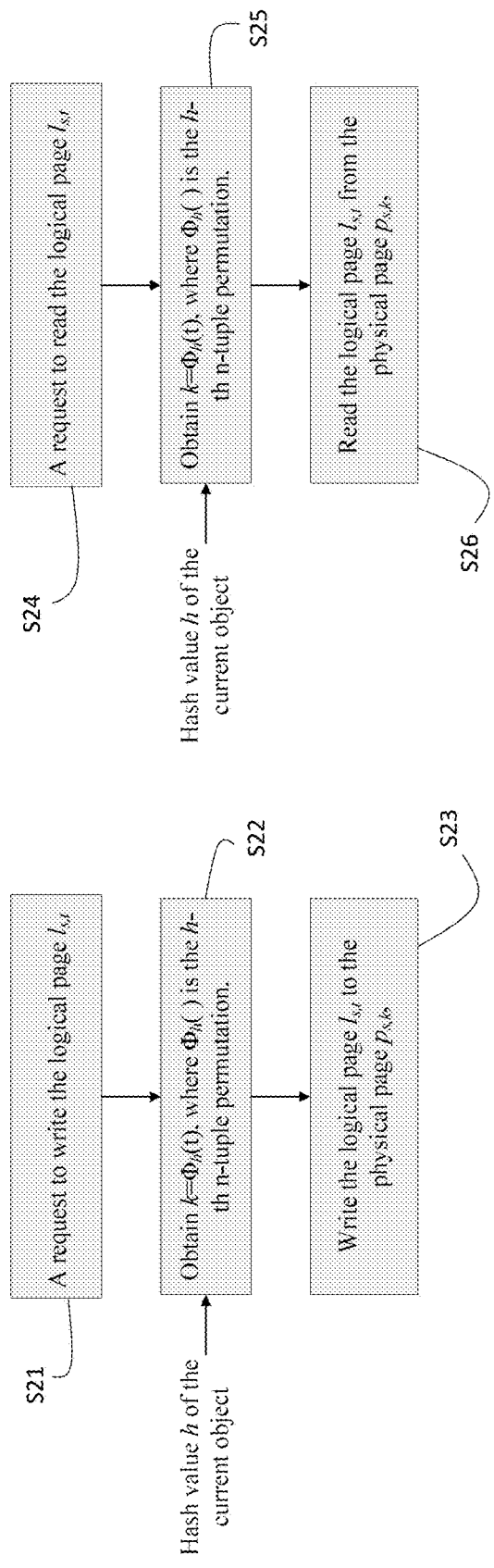
FIG. 4 illustrates the randomized intra-super-page data shuffling strategy according to embodiments.

FIG. 4 shows the flow diagram for writing (S21-S23) and reading (S24-S25) data in each super-page using this randomized intra-super-page data shuffling strategy. At S21, a request is made to write to the logical page $l_{s,t}$ and at S22 $k=\Phi_h(t)$ is obtained based on the hash value h of the current object. At S23, the logical page $l_{s,t}$ is written to the physical page $p_{s,k}$. At S24, a request is made to read the logical page $l_{s,t}$ and at S25 $k=\Phi_h(t)$ is obtained based on the hash value h of the current object. At S26, the logical page $l_{s,t}$ is written to the physical page $p_{s,k}$.

An advantage of this design strategy is described as follows: for in-flash processing tasks with multiple immutable objects as input, they tend to request data from multiple objects sequentially or in a streaming fashion. Without the randomized data shuffling, read requests to multiple objects may hit the same channel, leading to flash memory access conflict and hence longer read latency. This design strategy can uniformly spread the read requests to multiple objects over multiple channels, leading to largely reduced flash memory access conflict and hence a much lower latency.

Figure 5:
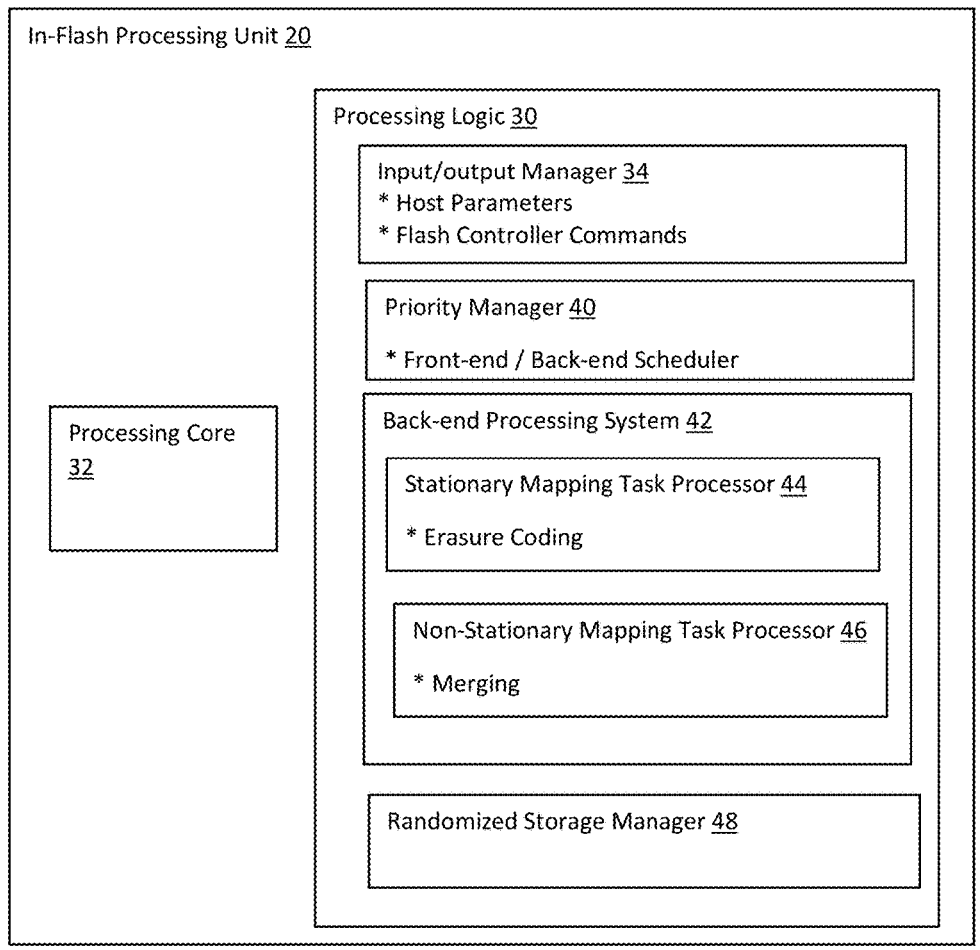
FIG. 5 illustrates an in-flash processing unit according to embodiments.

FIG. 5 shows a system diagram of the in-flash processing unit 20 implemented as part of the controller 14 (FIG. 1), which may for example be implemented as a flash card or similar device. In-flash processing unit 20 generally includes a processing core 32, processing logic 30, and other systems such as input/output system, etc. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Processing logic 30 generally includes: an input/output manager 34 that receives host parameters and generates commands to flash memory controller 22 (FIG. 1); a priority manager 40 that ensures front-end processing is prioritized over and back-end processing; a back-end processing system 42 for handling back-end processes; and a randomized storage processor 48 that manages writing and reading of data using a randomized process. Back-end processing system 42 includes a stationary mapping task processor 44 for handling stationary mapping tasks such as erasure coding and a non-stationary mapping task processor 46 for handling non-stationary mapping tasks such as those that involve object merging.

The embodiments of the present disclosure are applicable to various types of storage devices without departing from the spirit and scope of the present disclosure. It is also contemplated that the term host may refer to various devices capable of sending read/write commands to the storage devices. It is understood that such devices may be referred to as processors, hosts, initiators, requesters or the like, without departing from the spirit and scope of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by processing logic implemented in hardware and/or computer readable program instructions. For example, controller 14 may be implemented with a field programmable gate array (FPGA) device, application specific integrated circuit (ASIC) device, a general purpose IC or any other such device.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. An in-flash processing system, comprising:
   an input/output manager that receives parameters from a host to perform back-end data processing on immutable objects and that outputs commands to read and write immutable data objects to and from super-pages in a set of flash memory storage devices, wherein different immutable objects do not share super-pages;
   a priority manager that ensures that front-end data processing tasks take priority over back-end data processing tasks; and
   a back-end processing system that performs at least one of: erasure coding in which common segments from each of a set of inputted immutable objects are processed to generate segments of an immutable output object; or a merge operation in an LSM-tree based key-value store.

2. The in-flash processing system of claim 1, wherein the parameters received from the host include at least one identifier for identifying at least one immutable object; at least one identifier for identifying at least one output immutable object to be generated by the back-end processing system for storage in the set of flash memory storage devices; and processing function information regarding a processing function to be executed by the back-end processing system.

3. The in-flash processing system of claim 1, wherein back-end processing system includes:
   a stationary mapping task processor; and
   a non-stationary mapping task processor.

4. A method of processing immutable objects being read from and written to a set of flash memory storage devices, comprising:
   reading and writing immutable data objects to and from randomized page locations within a super-page;
   receiving, at a flash storage controller, parameters from a host to perform a back-end data processing task on at least one immutable object;
   suspending the back-end data processing task if there are any front-end data processing tasks to be performed; and
   performing the back-end processing task on the at least one immutable object in order to generate at least one new immutable object, wherein the back-end processing task performs at least one of: erasure coding in which common segments from each of a set of inputted immutable objects are processed to generate segments of an immutable output object; or a merge operation in an LSM-tree based key-value store.

5. The method of claim 4, wherein the parameters received from the host include at least one identifier for identifying the at least one immutable object in a set of flash memory storage devices; at least one identifier for identifying the at least one output immutable object to be generated and stored in the set of flash memory storage devices; and processing function information regarding the back-end processing task.

6. The method of claim 4, wherein back-end processing task includes one of:
   a stationary mapping task; and
   a non-stationary mapping task.

7. The method of claim 6, wherein the stationary mapping task performs erasure coding and the non-stationary mapping task processor performs an object merging process.

8. The method of claim 4, wherein the randomized page locations are determined based on a hash value derived from the immutable data objects.

9. A storage infrastructure, comprising:
   a host; and
   a storage device, having:
      a randomize storage manager that reads and writes immutable data objects to and from randomized page locations within a super-page;
      an input/output manager that receives parameters from the host to perform back-end data processing on immutable objects and that outputs commands to read and write immutable data objects to and from super-pages in a set of flash memory storage devices;
      a priority manager that ensures that front-end data processing tasks take priority over back-end data processing tasks; and
      a back-end processing system performs at least one of: erasure coding in which common segments from each of a set of inputted immutable objects are processed to generate segments of an immutable output object; or a merge operation in an LSM-tree based key-value store.

10. The storage infrastructure of claim 9, wherein the parameters received from the host include at least one identifier for identifying at least one immutable object; at least one identifier for identifying at least one output immutable object to be generated by the back-end processing system for storage in the set of flash memory storage devices; and processing function information regarding a processing function to be executed by the back-end processing system.

11. The storage infrastructure of claim 9, wherein back-end processing system includes:
    a stationary mapping task processor; and
    a non-stationary mapping task processor.

12. The storage infrastructure of claim 11, wherein the stationary mapping task processor performs erasure coding.

13. The storage infrastructure of claim 11, wherein the non-stationary mapping task processor performs an object merging process.

14. The storage infrastructure of claim 9, wherein the randomize storage manager determines randomized page locations based on a hash value derived from the immutable data objects.

15. An in-flash processing system, comprising:
    an input/output manager that receives parameters from a host to perform back-end data processing on immutable objects and that outputs commands to read and write immutable data objects to and from super-pages in a set of flash memory storage devices;
    a priority manager that ensures that front-end data processing tasks take priority over back-end data processing tasks;
    a back-end processing system that processes at least one immutable object in order to generate at least one new immutable object; and
    a randomize storage manager that reads and writes an immutable data object to and from randomized page locations within a super-page.

16. The in-flash processing system of claim 15, wherein the randomize storage manager determines randomized page locations based on a hash value derived from the immutable data object.

* * * * *